(12) United States Patent
Salahat

(10) Patent No.: US 11,518,243 B2
(45) Date of Patent: Dec. 6, 2022

(54) DYNAMIC VEHICLE HEAD UNIT LOCKOUT SYSTEM

(71) Applicant: TOYOTA MOTOR NORTH AMERICA, INC., Plano, TX (US)

(72) Inventor: Brandon Salahat, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 261 days.

(21) Appl. No.: 16/751,023

(22) Filed: Jan. 23, 2020

(65) Prior Publication Data

US 2021/0229555 A1 Jul. 29, 2021

(51) Int. Cl.
*B60N 2/00* (2006.01)
*B60K 37/06* (2006.01)
*B60W 50/00* (2006.01)

(52) U.S. Cl.
CPC .............. *B60K 37/06* (2013.01); *B60N 2/002* (2013.01); *B60W 50/0098* (2013.01); *B60K 2370/197* (2019.05)

(58) Field of Classification Search
None
See application file for complete search history.

(56) References Cited

U.S. PATENT DOCUMENTS

| | | | |
|---|---|---|---|
| 6,668,221 B2 | 12/2003 | Harter, Jr. et al. | |
| 7,453,444 B2 | 11/2008 | Geaghan | |
| 7,567,222 B2 | 7/2009 | Tanaka et al. | |
| 8,102,381 B2 | 1/2012 | Kimura | |
| 8,704,651 B2 | 4/2014 | Nix et al. | |
| 9,969,268 B2 | 5/2018 | Van Wiemeersch et al. | |
| 2009/0082951 A1 | 3/2009 | Graessley | |
| 2014/0168091 A1* | 6/2014 | Jones ................. | G01C 21/3664 345/173 |
| 2018/0326851 A1* | 11/2018 | Kim ...................... | G06F 3/0488 |

FOREIGN PATENT DOCUMENTS

DE 102004033275 A1 2/2006

\* cited by examiner

*Primary Examiner* — James M McPherson
(74) *Attorney, Agent, or Firm* — Haynes and Boone, LLP

(57) ABSTRACT

Disclosed is a system for controlling subsystems of a vehicle. The system comprises a control unit, a speedometer or vehicle speed unit, a sensor in communication with the control unit that is configured to detect at least one of a first activation stimulus or a second activation stimulus; and a control panel in communication with the control unit. The control panel displays a plurality of selectable vehicle control options. When the vehicle is moving above a threshold velocity, at least one vehicle control option is disabled for the first activation stimulus and enabled for the second activation stimulus.

17 Claims, 4 Drawing Sheets

DYNAMIC VEHICLE HEAD UNIT LOCKOUT SYSTEM

TECHNICAL FIELD

The subject matter described herein relates to devices and methods for detecting a user trying to access vehicle menus and providing selective access to the vehicle menus based on whether the user is a driver or a passenger in a vehicle. This technology has particular but not exclusive utility for head unit touchscreens in cars and trucks.

BACKGROUND

Modern vehicles include an array of option controls, including navigation, audio, climate, and assisted driving controls. In some cases, option controls are accessed through a head unit touchscreen or other user interface located on a vehicle dashboard or within the vehicle cockpit or cabin. In these cases, tactile feedback (e.g., the feeling of physical button presses or switch flips) may not be available, which may increase a tendency for vehicle operators to look at the touchscreen while operating option controls. This can raise safety concerns if a vehicle operator attempts to activate the touchscreen while the vehicle is moving. However, operation of a touchscreen interface or other user interface by a passenger presents substantially less hazard, regardless of vehicle motion.

The information included in this Background section of the specification, including any references cited herein and any description or discussion thereof, is included for technical reference purposes only and is not to be regarded as limiting.

SUMMARY

Disclosed is a head unit lockout system that detects a user trying to access vehicle menus or other option controls, and provides selective access to the vehicle menus based on the detected user (e.g., based on whether the user is a driver or a passenger in a vehicle). The present disclosure thus proposes a vehicle system for a vehicle that includes a control unit in communication with sensors and a head unit or other control panel. The control unit receives signals from the sensors and analyzes the signals to determine who is reaching for (i.e., trying to operate) the head unit. The control unit then provides access to the option control menus based on who is reaching for the head unit. For example, the control unit provides access to the head unit (e.g., locks or unlocks a touchscreen of the head unit) based on whether a driver or a passenger are reaching for the head unit, as determined by the control unit. The sensors may include a 2D camera, 3D camera, radar, lidar, sonar, motion sensors, proximity sensors, or the like.

The head unit lockout system disclosed herein has particular, but not exclusive, utility for touchscreen displays used in cars and trucks. One general aspect of the head unit lockout system includes a system for controlling subsystems of a vehicle. The system also includes a control unit; a vehicle speed unit; a sensor in communication with the control unit, where the sensor is configured to detect at least one of a first activation stimulus or a second activation stimulus; and a control panel in communication with the control unit, the control panel displaying a plurality of selectable vehicle control options, where when the vehicle speed unit determines that the vehicle is moving above a threshold velocity, at least one vehicle control option of the plurality of selectable vehicle control options is disabled for the first activation stimulus and enabled for the second activation stimulus, such that the first activation stimulus is not able to select the at least one vehicle control option, and such that the second activation stimulus is able to select the at least one vehicle control option. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Implementations may include one or more of the following features. The system where the sensor is a 2D sensor. The system where the sensor is a 3d sensor. The system where the sensor is at least one of a camera, sonar, lidar, radar, motion detector, proximity detector, or RF shadow detector. The system where the first activation stimulus includes a right hand approaching the control panel. The system where the first activation stimulus further includes that the right hand is not approaching from a passenger's side of the vehicle. The system where the first activation stimulus includes that a presence of a passenger is not detected in the vehicle. The system where the second activation stimulus further includes that the left hand is not approaching from a driver's side of the vehicle. The system where the second activation stimulus includes a left hand approaching the control panel. The system where the at least one vehicle control option is a vehicle sound system, navigation system, lighting system, safety system, sensor system, or communication system option. The system where the at least one vehicle control option of the plurality of selectable vehicle control options that is disabled is displayed differently than the at least one vehicle control option of the plurality of selectable vehicle control options is enabled. The system where the sensor is located in an interior of the vehicle. The system where the sensor is a 2D or 3D sensor. The system where the sensor is at least one of a camera, sonar, lidar, radar, motion detector, proximity detector, or RF shadow detector. The system where the first activation stimulus includes a right hand approaching the control panel. The system where the first activation stimulus further includes that the right hand is not approaching from a passenger's side of the vehicle. The system where the second activation stimulus includes a left hand approaching the control panel. The system further including the vehicle. The system where the second activation stimulus includes that the left hand is not approaching from a driver's side of the vehicle. Implementations of the described techniques may include hardware, a method or process, or computer software on a computer-accessible medium.

One general aspect includes a method for controlling subsystems of a vehicle. The method also includes displaying, on a control panel, a plurality of selectable vehicle control options; receiving, at a control unit in communication with the control panel, speed data from a speedometer and sensor data from a sensor; detecting, with the control unit and based on the sensor data, at least one of a first activation stimulus or a second activation stimulus; and when the speedometer indicates the vehicle is moving above a threshold velocity: disabling at least one vehicle control option of the plurality of selectable vehicle control options when the first activation stimulus is detecting; and enabling the at least one vehicle control option of the plurality of selectable vehicle control options when the second activation stimulus is detected, such that the first activation stimulus is not able to select the at least one vehicle control option, and such that the second activation stimulus is able to select the at least one vehicle control option. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the head unit lockout, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
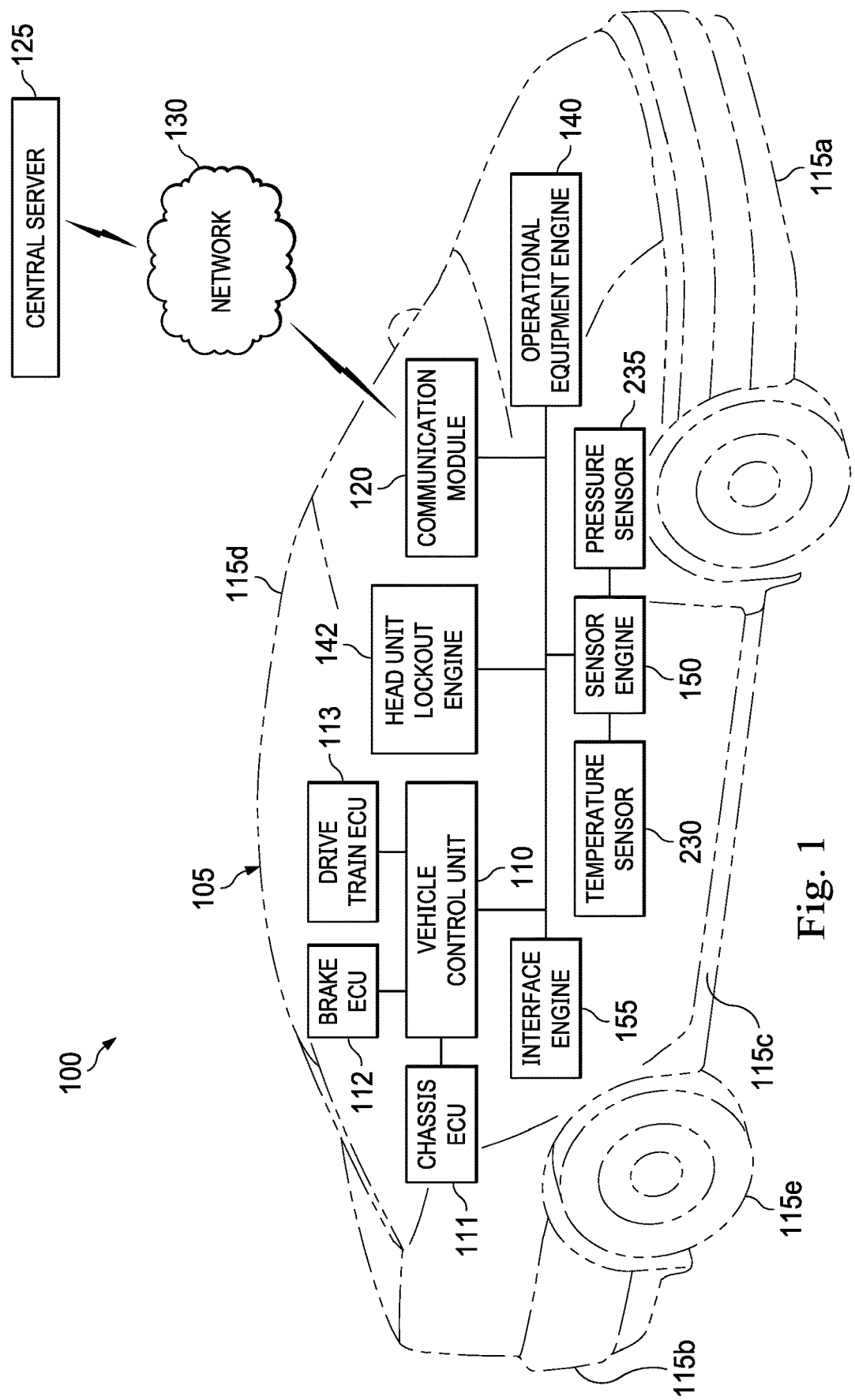
FIG. 1 is a diagrammatic illustration of a vehicle head unit lockout system in accordance with at least one embodiment of the present disclosure.

In accordance with at least one embodiment of the present disclosure, a vehicle head unit lockout system is provided that detects a user trying to access vehicle menus or other option controls, and provides selective access to the option controls based on the detected user (e.g., based on whether the user is a driver or a passenger in a vehicle). This determination can be made based on whether the hand reaching for the controls is a left hand or a right hand. Option controls are typically placed near the center of a vehicle dashboard, such that they can be readily operated by either a driver or a passenger. In vehicles where the driver is located on the left side of the vehicle, the driver typically reaches for the option controls with a right hand. Similarly, when a front-seat passenger is located on the right side of the vehicle, the passenger typically reaches for option controls using a left hand. Thus, if a left hand is detected, the head unit operator is assumed to be a passenger, whereas if a right hand is detected, the head unit operator is presumed to be the driver. When the vehicle is traveling above a threshold speed (e.g., 10 mph) as indicated for example by the vehicle speedometer, the system may lock option controls for the driver, thus preventing the driver from operating the option controls and potentially becoming distracted, while simultaneously permitting the option controls to be operated by the passenger. The left and right sides may be swapped in this description for vehicles with a right-side driver configuration.

The vehicle head unit lockout system includes a control unit in communication with sensors and a head unit or other control panel. The control unit receives signals from the sensors and analyzes the signals to determine who is reaching for (i.e., trying to operate) the head unit. The sensors may include a three-dimensional (3D) camera, radar, lidar, sonar, 3D motion sensors, 3D proximity sensors, or other sensors (including 2D sensors) that are capable, either singly or in combination, of providing data to the control unit that can be used for example to discriminate a left hand from a right hand.

In some examples, the sensors include 3D cameras that track 3D images of a hand approaching the head unit. Based on the 3D images of the approaching hand, the control unit can determine whether a right hand or a left hand is reaching for the head unit. In some examples, the control unit may determine that the approaching hand is a driver's hand when the control unit determines that the sensor data depicts a right hand, or a passenger's hand when the control unit determines that the sensor data depicts a left hand. Accordingly, the control unit dynamically identifies whether a driver or a passenger is trying to access the head unit and sets access to the head unit based on the identification. If the driver attempts to access the head unit, the control unit can limit functional access to the head unit (e.g., lock menus/controls for selecting at least some of the available options on the head unit). If the passenger attempts to access the head unit, the control unit can provide greater functional access or complete functional access to the head unit.

In some examples, the control unit may limit functionality of the head unit only when the vehicle is traveling above a predetermined speed. For example, when the vehicle is moving over five miles per hour (8 kph), the control unit can lock the head unit and provide very limited functionality of the head unit (e.g., the control unit may provide only voice control of the head unit). In some examples, the head unit may remain unlocked, and the control unit may only lock the head unit upon determining that the driver is reaching for the head unit. In some examples, the head unit may remain locked, and the control unit actively unlocks the head unit upon determining that the passenger is reaching for the head unit. In some examples, the proposed vehicle system is activated any time the vehicle transmission is not in park, without any speed exceptions.

The present disclosure aids substantially in limiting driver distraction while retaining vehicle functionality, by improving the ability of vehicle option controls to lock out operation by a driver while remaining operable by a passenger. Implemented on a touchscreen display in communication with a processor, the head unit lockout system disclosed herein provides practical, context sensitive lockout discrimination. This improved discrimination transforms a potentially driver-distracting operation into one that can be safely performed by a vehicle passenger, without the normally routine need to lock head unit controls for both the driver and the passenger. This unconventional approach improves the functioning of the vehicle, by making a greater range of functions safely operable while the vehicle is in motion.

The head unit lockout system may be implemented as a lockable touchscreen interface, with menus that are viewable on the touchscreen display, and operated by a control process executing on a processor that accepts user inputs from the touchscreen, or from a 3D shape sensor, motion or gesture sensor, control panel, joystick, switches, buttons, or other user interface. In that regard, the control process performs certain specific operations in response to different inputs or selections made at different times, either by the vehicle driver or by a passenger. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the head unit lockout system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic illustration of a vehicle head unit lockout system in accordance with at least one embodiment of the present disclosure. In an example, a vehicle head unit lockout system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the vehicle head unit lockout system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a head unit lockout engine or option control lockout engine142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
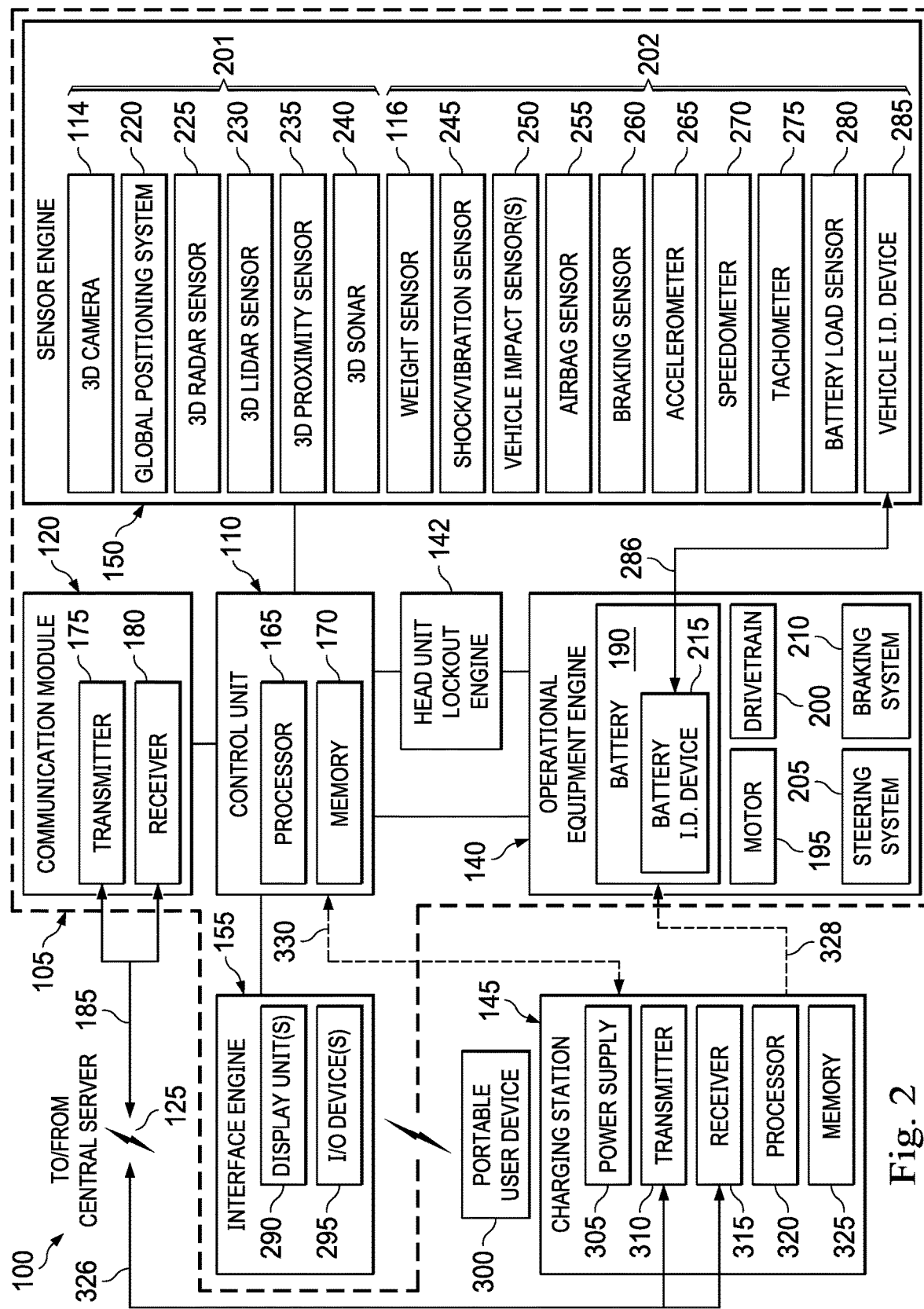
FIG. 2 is a diagrammatic illustration, in a block-diagram form, of at least a portion of the head unit lockout system of FIG. 1, in accordance with at least one embodiment of the present disclosure.

FIG. 2 is a diagrammatic illustration, in a block-diagram form, of at least a portion of the head unit lockout system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a 2D or 3D radar sensor 225, a 2D or 3D lidar sensor 230, a 2D or 3D proximity sensor 235, a 2D or 3D sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a 2D or 3D camera 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The vehicle head unit lockout system 100 also includes a head unit lockout or option control lockout engine 142, the operation of which will be described below. In some embodiments, the head unit lockout engine 142 comprises a standalone housing with its own processor and memory. In other embodiments, the head unit lockout engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the head unit lockout engine 142 receives sensor data from an inward-facing (e.g., driver- and passenger-facing) radar 225, lidar 230, proximity sensor 235, sonar 240, camera 114, or other sensor 201 in order to determine whether aspects of the interface engine 155 are being operated by a driver or by a passenger. In some embodiments, the head unit lockout engine 142 may be activated when the speedometer 270 indicates the vehicle is traveling above a threshold speed (e.g., 5 mph or 10 mph), and may be inactivated when the speedometer 270 indicates the vehicle is stopped or traveling below the threshold speed.

A reader of ordinary skill in the art will understand that other components or arrangements of components may be found in a vehicle 105, and that the same general principles apply to electric vehicles, internal combustion vehicles, and hybrid vehicles.

Figure 3:
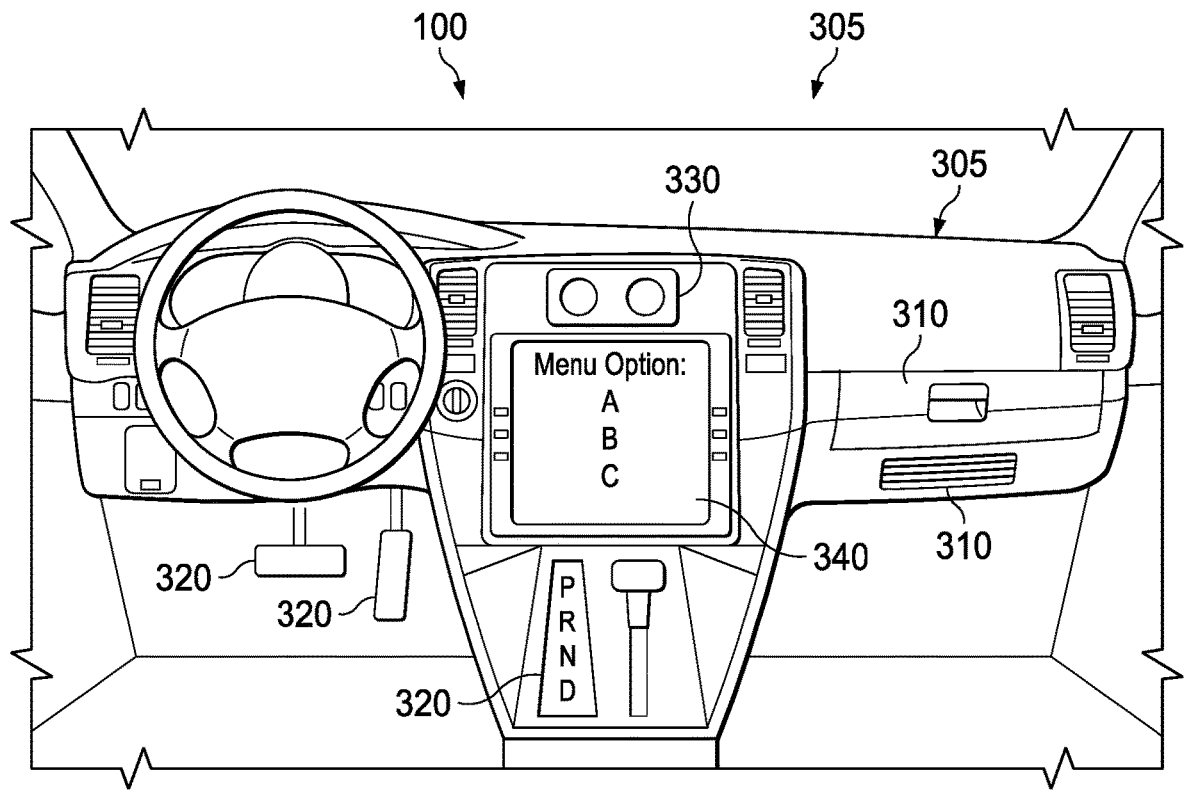
FIG. 3 is a diagrammatic view of an example vehicle cockpit or cabin that includes a head unit lockout system in accordance with at least one embodiment of the present disclosure.

FIG. 3 is a diagrammatic view of an example vehicle cockpit or cabin 305 that includes a head unit lockout system 100 in accordance with at least one embodiment of the present disclosure. Visible are vehicle interior design features 310 and driving controls 320, as well as a sensor 330 and a head unit, touchscreen, or option control panel 340. In an example, the sensor 330 provides sensor data to a processor such as a VCU 110 or head unit lockout engine 142 (as shown for example in FIGS. 1 and 2), or processor circuit 750 (as shown for example in FIG. 7), that enables the processor to detect a hand approaching the head unit or option control panel 340, and to determine whether the hand is a right hand or a left hand. The system 100 can then lock at least some of the controls of the head unit or option control panel 340 if the hand is a right hand, or unlock at least some of the controls of the head unit or option control panel 340 if the hand is a left hand.

Figure 4:
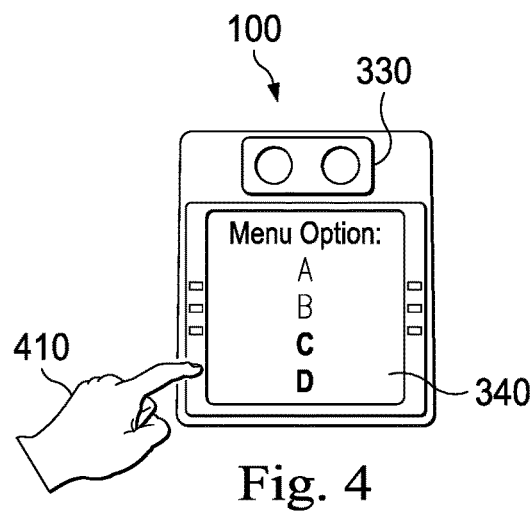
FIG. 4 is a diagrammatic view of an example head unit or option control panel incorporating a head unit lockout system.

FIG. 4 is a diagrammatic view of an example head unit or option control panel 340 incorporating a head unit lockout system 100. In the example shown in FIG. 4, the sensor 330 enables the system 100 to detect the approach of a right hand 410. The system may presume the right hand 410 to be the hand of a driver, and accordingly, to lock the touchscreen of the head unit 340, or alternatively, to disable one or more specific buttons, switches, softkeys, sliders, check boxes, menu options, or other option selection features accessible through the head unit or option control panel 340. In an example, locked features may be hidden or grayed out, while available features are displayed normally or prominently, or otherwise differently from the locked features.

In some embodiments, the sensor 330 additionally detects the direction from which the hand is approaching so that, for example, the system 100 discriminates a passenger's right hand from a driver's right hand and, if a passenger's right hand is approaching the head unit 340, the touchscreen of the head unit 340 is not locked. This may for example prevent the system from inappropriately or unnecessarily locking out the passenger from operating the head unit 340 or other user interface. In some embodiments, the system 100 using the sensor 330 determines whether the driver has both hands on the steering wheel or other driver controls and, if so, the touchscreen of the head unit 340 is not locked.

Figure 5:
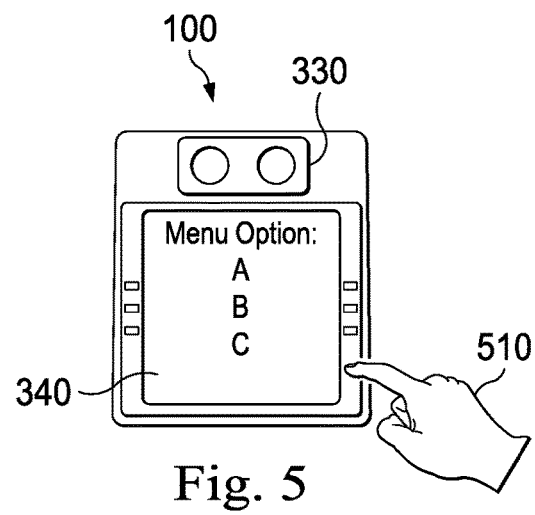
FIG. 5 is a diagrammatic view of an example head unit or option control panel incorporating a head unit lockout system.

FIG. 5 is a diagrammatic view of an example head unit or option control panel 340 incorporating a head unit lockout system 100. In the example shown in FIG. 5, the sensor 330 enables the system 100 to detect the approach of a left hand 510. The system may presume the left hand 510 to be the hand of a passenger, and accordingly, to unlock the touchscreen of the head unit 340, or alternatively, to unlock one or more specific buttons, switches, softkeys, sliders, check boxes, menu options, or other option selection features accessible through the head unit or option control panel 340.

In some embodiments, system 100, using the sensor 330, or a combination of sensors (including for example a weight sensor 116, exterior camera system 114, door open sensor, eye-tracking sensor, facial recognition sensor, or otherwise) detects whether a passenger is present at all and, if not, the system 100 locks the some or all features of the touchscreen of the head unit 340, regardless of whether the hand approaching the head unit 340 is a right or left hand. This may for example prevent a driver from attempting to circumvent the lockout by operating the head unit with a left hand. In some embodiments, this determination may be performed or assisted by a machine learning algorithm or other learning artificial intelligence.

Figure 6:
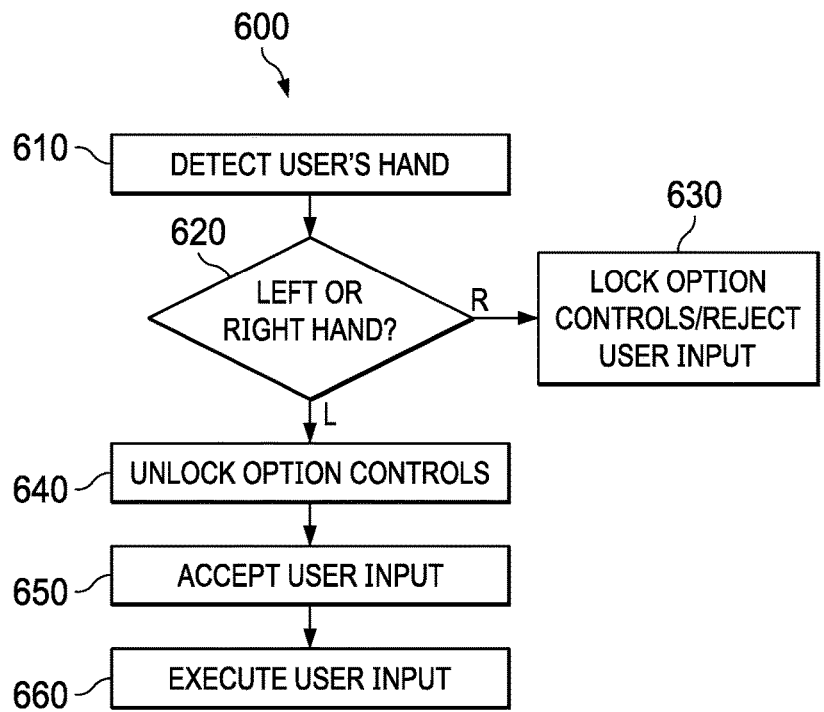
FIG. 6 shows a flow diagram of an example head unit lockout control method according to at least one embodiment of the present disclosure.

FIG. 6 shows a flow diagram of an example head unit lockout control method 600 according to at least one embodiment of the present disclosure. It is understood that the steps of method 600 may be performed in a different order than shown in FIG. 6, additional steps can be provided before, during, and after the steps, and/or some of the steps described can be replaced or eliminated in other embodiments. One or more of steps of the method 600 can be carried by one or more devices and/or systems described herein, such as the VCU 110 or head unit lockout control engine 142 of FIGS. 1 and 2, and/or processor circuit 750 of FIG. 7.

In step 610, the method 600 includes detecting the approach of a user's hand attempting to operate the vehicle head unit or other option control panel. Step 610 will continue executing until a hand is detected, in which case the method will proceed to step 620.

In step 620, the method 600 includes determining whether the approaching hand is a left hand or a right hand. This may be done for example using 2D or 3D data from one or more sensors (e.g., cameras, sonar, lidar, radar, motion detectors, proximity detectors, WiFi or other RF shadow detectors, etc.), coupled with image recognition, shape recognition, feature recognition, gesture recognition, machine learning, deep learning, or other classical or artificial intelligence algorithms as would be available to a practitioner of ordinary skill in the art for identifying the geometrical, anatomical, orientational, or kinematic features that distinguish a right hand from a left hand. If the method determines that the detected hand is a right hand, execution proceeds to step 630. If the method determines the detected hand is a left hand, execution proceeds to step 640.

In step 630, the method 600 includes locking at least some of the option controls available through the head unit or option control panel or, alternatively, of rejecting user input for at least some of the option controls. In some instances, touchscreen touch sensitivity may be switched off or ignored such that the head unit or option control panel cannot be operated at all by the detected right hand.

In step 640, the method 600 includes unlocking, or leaving unlocked if already unlocked, at least some of the option controls available through the head unit or option control panel or, alternatively, of accepting user input for at least some of the option controls. In some instances, all of the option controls available through the head unit or option control panel may be enabled for operation by the detected left hand.

In step 650, the method 600 includes accepting user input or inputs received by the system via one or more option controls that have been enabled, unlocked, or left unlocked by the execution of step 640.

In step 660, the method 600 includes executing the user input or inputs that were accepted by the system in step 650. This may involve, for example, a control unit sending control signals to one or more components or processors in order to change a selected status or setting for one or more vehicle subsystems, including but not limited to a vehicle sound system, navigation system, lighting system, safety system, sensor system, or communication system (e.g., Bluetooth connection to a cellular device).

The terms "left" and "right" in the example method 600 presume that the driver sits on the left side of the vehicle. "Left" and "right" may be swapped for vehicles with a right-side driver configuration.

Figure 7:
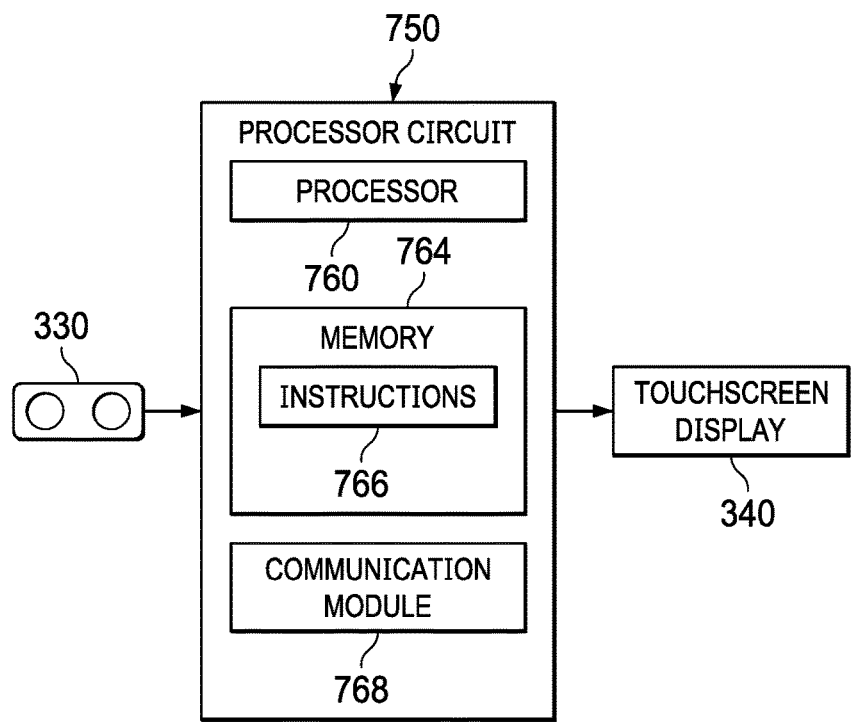
FIG. 7 is a schematic diagram of a processor circuit, according to embodiments of the present disclosure.

FIG. 7 is a schematic diagram of a processor circuit 750, according to embodiments of the present disclosure. The processor circuit 750 may be implemented in the vehicle head unit lockout engine 142 or VCU 110 of FIGS. 1 and 2, or other devices or workstations (e.g., third-party workstations, network routers, etc.), or on a cloud processor or other remote processing unit, as necessary to implement the method. As shown, the processor circuit 750 may include a processor 760, a memory 764, and a communication module 768. These elements may be in direct or indirect communication with each other, for example via one or more buses.

The processor 760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 760 may also comprise another hardware device, a firmware device, or any combination thereof configured to perform the operations described herein. The processor 760 may also be implemented as a combination of computing devices, e.g., a combination of a DSP and a microprocessor, a plurality of microprocessors, one or more microprocessors in conjunction with a DSP core, or any other such configuration.

The memory 764 may include a cache memory (e.g., a cache memory of the processor 760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 764 includes a non-transitory computer-readable medium. The memory 764 may store instructions 766. The instructions 766 may include instructions that, when executed by the processor 760, cause the processor 760 to perform the operations described herein. Instructions 766 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 768 can include any electronic circuitry and/or logic circuitry to facilitate direct or indirect communication of data between the processor circuit 750, and other processors or devices. In that regard, the communication module 868 can be an input/output (I/O) device. In some instances, the communication module 868 facilitates direct or indirect communication between various elements of the processor circuit 850 and/or the vehicle head unit lockout system 100. The communication module 1068 may communicate within the processor circuit 750 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, e.g., a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

In the example shown in FIG. 7, the processor circuit 750 receives sensor data from a 3D sensor 330, and also receives input from and/or sends output to a touchscreen display 340 or other option control device (e.g., one or more switches, buttons, joysticks, keyboards, gesture control interfaces, etc.).

As will be readily appreciated by those having ordinary skill in the art after becoming familiar with the teachings herein, the head unit lockout advantageously permits a vehicle head unit or other control panel to lock out at least some of its option controls while the vehicle is in motion, but selectively unlock at least some of the option controls when a passenger (as opposed to the driver) is attempting to operate them. Depending on the implementation, a number of variations are possible on the examples and embodiments described above. For example, left and right conventions in the present disclosure may apply to road and vehicle configurations typical for the U.S., E.U., and South America. Use of the terms "left" and "right" in this application may be swapped for jurisdictions such as Great Britain, Japan, and Australia, where road and vehicle configurations are different. Different kinds of sensors may be used to detect and analyze users' hands. The technology may be applied to different vehicle types, including on-road and off-road vehicles, watercraft, and aircraft.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the head unit lockout. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the head unit lockout as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for controlling subsystems of a vehicle, the system comprising:
    a control unit;
    a vehicle speed unit;
    a sensor in communication with the control unit, wherein the sensor is configured to detect at least one of a first activation stimulus or a second activation stimulus; and
    a control panel in communication with the control unit and positioned to the right of a steering wheel of the vehicle, the control panel displaying a plurality of selectable vehicle control options viewable and selectable from both a driver's side of the vehicle and a passenger's side of the vehicle,
    wherein the first activation stimulus includes a right hand approaching the control panel, and wherein the second activation stimulus includes a left hand approaching the control panel,
    wherein when the vehicle speed unit determines that the vehicle is moving below a threshold velocity, the plurality of selectable vehicle control options are enabled for the first and second activation stimulus,
        such that the first activation stimulus is able to select any selectable vehicle control option of the plurality of selectable vehicle control options, and
        such that the second activation stimulus is able to select any selectable vehicle control option of the plurality of selectable vehicle control options,
    wherein when the vehicle speed unit determines that the vehicle is moving at or above the threshold velocity, at least one vehicle control option of the plurality of selectable vehicle control options is disabled for the first activation stimulus and enabled for the second activation stimulus,
    such that the first activation stimulus is not able to select the at least one vehicle control option, and
    such that the second activation stimulus is able to select the at least one vehicle control option.

2. The system of claim 1, wherein the sensor is a 2D sensor.

3. The system of claim 1, wherein the sensor is a 3D sensor.

4. The system of claim 1, wherein the sensor is at least one of a camera, sonar, lidar, radar, motion detector, proximity detector, or RF shadow detector.

5. The system of claim 1, wherein the first activation stimulus further includes that the right hand is not approaching from a passenger's side of the vehicle.

6. The system of claim 1, wherein the first activation stimulus includes that a presence of a passenger is not detected in the vehicle.

7. The system of claim 1, wherein the second activation stimulus further includes that the left hand is not approaching from a driver's side of the vehicle.

8. The system of claim 1, wherein the at least one vehicle control option is a vehicle sound system, navigation system, lighting system, safety system, sensor system, or communication system option.

9. The system of claim 1, wherein the at least one vehicle control option of the plurality of selectable vehicle control options that is disabled is displayed differently than the at least one vehicle control option of the plurality of selectable vehicle control options is enabled.

10. The system of claim 1, further comprising the vehicle.

11. A method for controlling subsystems of a vehicle, the method comprising:
    displaying, on a control panel positioned to the right of a steering wheel of the vehicle, a plurality of selectable vehicle control options viewable and selectable from both a driver's side of the vehicle and a passenger's side of the vehicle;

receiving, at a control unit in communication with the control panel, speed data from a speedometer and sensor data from a sensor, detecting, with the control unit and based on the sensor data, at least one of a first activation stimulus or a second activation stimulus, wherein the first activation stimulus includes a right hand approaching the control panel, and wherein the second activation stimulus includes a left hand approaching the control panel; and when the speedometer indicates that the vehicle is moving below a threshold velocity, enabling the plurality of vehicle control options for the first and second activation stimulus,
- such that the first activation stimulus is able to select any selectable vehicle control option of the plurality of selectable vehicle control options, and
- such that the second activation stimulus is able to select any selectable vehicle control option of the plurality of selectable vehicle control options;

when the speedometer indicates the vehicle is moving at or above the threshold velocity:
- disabling at least one vehicle control option of the plurality of selectable vehicle control options when the first activation stimulus is detecting; and
- enabling the at least one vehicle control option of the plurality of selectable vehicle control options when the second activation stimulus is detected,
- such that the first activation stimulus is not able to select the at least one vehicle control option, and
- such that the second activation stimulus is able to select the at least one vehicle control option.

12. The method of claim 11, wherein the sensor is located in an interior of the vehicle.

13. The method of claim 11, wherein the sensor is a 2D or 3D sensor.

14. The method of claim 11, wherein the sensor is at least one of a camera, sonar, lidar, radar, motion detector, proximity detector, or RF shadow detector.

15. The method of claim 11, wherein the first activation stimulus further includes that the right hand is not approaching from a passenger's side of the vehicle.

16. The method of claim 11, wherein the second activation stimulus includes that the left hand is not approaching from a driver's side of the vehicle.

17. The system of claim 1, wherein the control panel is a single control panel positioned to the right of the steering wheel of the vehicle.

* * * * *